US006442557B1

(12) United States Patent
Buteau et al.

(10) Patent No.: US 6,442,557 B1
(45) Date of Patent: *Aug. 27, 2002

(54) EVALUATION OF ENTERPRISE ARCHITECTURE MODEL INCLUDING RELATIONAL DATABASE

(75) Inventors: Brandon L. Buteau; Christine S. Moulton, both of Hollis, NH (US)

(73) Assignee: PRC Inc., McLean, VA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,890

(22) Filed: Feb. 27, 1998

(51) Int. Cl.[7] ............................................. G06F 17/30
(52) U.S. Cl. .............................. 707/102; 707/3; 705/7
(58) Field of Search ........................ 707/103, 100–102, 707/1–4, 104.1; 705/7–11

(56) References Cited

U.S. PATENT DOCUMENTS

| | | | | |
|---|---|---|---|---|
| 4,893,270 A | | 1/1990 | Beck et al. ................. 364/400 |
| 4,930,072 A | | 5/1990 | Agrawal et al. ............ 707/101 |
| 4,992,940 A | | 2/1991 | Dworkin ...................... 705/26 |
| 5,019,961 A | * | 5/1991 | Addesso ..................... 364/192 |
| 5,201,046 A | | 4/1993 | Goldberg et al. ........... 707/100 |
| 5,233,513 A | * | 8/1993 | Doyle .......................... 705/1 |
| 5,488,722 A | * | 1/1996 | Potok ........................... 707/2 |
| 5,508,912 A | | 4/1996 | Schneiderman ............... 705/3 |
| 5,537,524 A | * | 7/1996 | Aprile ....................... 345/440 |
| 5,546,570 A | | 8/1996 | McPherson, Jr. et al. ..... 707/2 |
| 5,546,571 A | | 8/1996 | Shan et al. ................... 707/3 |
| 5,548,749 A | * | 8/1996 | Kroenke et al. ........... 707/102 |

(List continued on next page.)

OTHER PUBLICATIONS

"Reengineering with Enterprise Analyzer," Vogel et al., Proceedings of the 26th Hawaii International Conference on System Sciences, vol. 4, IEEE, pp. 127–136, Jan. 1993.*

(List continued on next page.)

Primary Examiner—Hosain T. Alam
(74) Attorney, Agent, or Firm—Lowe Hauptman Gilman & Berner, LLP

(57) ABSTRACT

A memory is provided for storing data for access by a database program being executed on a computer system for evaluating an enterprise architecture. A data structure is stored in the memory with the data structure including information resident in a database used by the database program. The data structure includes a work flow model, an information model; and a technology model. Each model includes a plurality of entities linking the models together. The computer system executes the database program for evaluating linkages between entities and how architectural changes to the enterprise affect the enterprise architecture by accessing the memory storing the data structure, and generates a result indicative of the linkages between entities.

30 Claims, 10 Drawing Sheets

U.S. PATENT DOCUMENTS

| | | | | |
|---|---|---|---|---|
| 5,566,333 A | * | 10/1996 | Olson et al. | 707/102 |
| 5,577,239 A | | 11/1996 | Moore et al. | 707/3 |
| 5,604,892 A | | 2/1997 | Nuttall et al. | 707/104 |
| 5,616,899 A | | 4/1997 | Recigno | 235/375 |
| 5,619,694 A | | 4/1997 | Shimazu | 707/104 |
| 5,630,069 A | * | 5/1997 | Flores et al. | 705/7 |
| 5,630,127 A | | 5/1997 | Moore et al. | |
| 5,633,910 A | | 5/1997 | Cohen | 379/38 |
| 5,649,182 A | | 7/1997 | Reitz | 707/7 |
| 5,659,723 A | * | 8/1997 | Dimitrios et al. | 707/103 |
| 5,675,784 A | | 10/1997 | Maxwell et al. | 707/100 |
| 5,842,193 A | * | 11/1998 | Reilly | 706/45 |
| 5,918,210 A | * | 6/1999 | Rosenthal et al. | 705/7 |
| 5,978,811 A | * | 11/1999 | Smiley | 707/103 |

OTHER PUBLICATIONS

"Enterprise Architecture: Definition, Content, and Utility," by Melody A. Rood, The MITRE Corp., pp. 106–111, IEEE, Jul. 1994.*

DoD Standards–Based Architecture Planning Guide, vol. 4, Technical Architecture Framework for Information Management, Apr. 30, 1996.

"Introduction to Enterprise Architecture Planning: Developing a Blue Print for Data, Applications and Technology", by Steven H. Spewak, QED Publishing Group, 1992, pp. 1–238.

"Fundamentals of Database Systems," Second Edition, Elmasri & Navathe, Addison–Wesley Publishing Company, Dec. 1994, pp. 675–677, "Type Hierarchies and Inheritance".*

* cited by examiner

EVALUATION OF ENTERPRISE ARCHITECTURE MODEL INCLUDING RELATIONAL DATABASE

FIELD OF THE INVENTION

The present invention relates generally to the study of enterprise architectures, and more particularly, to the use of a relational database in studying and analyzing enterprise architectures, and even more specifically, to inventive models for describing the relationships between technological and organizational components of enterprise architectures. The inventive models are especially powerful when used in conjunction with the relational database.

BACKGROUND OF THE INVENTION

Enterprise Architecture is a term first introduced by Zachman and later elaborated on by Spewak. An enterprise architecture can be used to answer questions such as how is the enterprise vulnerable to changes in key technologies and standards. Other questions are what are optimal priorities for technology upgrades and how are technology costs distributed over processes, organizations and locations.

Thus an enterprise architecture is used to solve strategic level problems for an enterprise. The enterprise can refer to human organizational systems ranging from small businesses to large legal entities (corporations, government departments) or their significant components. Information regarding the infrastructure of an organization is used in determining an enterprise architecture. An infrastructure of an enterprise is schematically illustrated in FIG. 1 and includes information about and interrelationships between the people 20 in the enterprise, the location(s) 22 of the enterprise, the processes 24 used in the enterprise, the information 26 used by the enterprise, and the technology components 28 of the enterprise.

Many organizations have a requirement to collect, analyze, and maintain a wide variety of enterprise architecture information. This information is generated/collected as part of an evolutionary process, which uses the organization can use to help develop, for example, a common MIS architecture. In the past, this type of information has been collected (if at all) on paper worksheets or, at best, spreadsheets. For example, the Department of Defense's (DoD's) Technical Architecture Model for Information Management (TAFIM) includes a large repertoire of sample worksheets for recording or baselining enterprise architecture data. Unfortunately, these methods make it difficult to gain the maximum flexibility and power from the architecture information, which must then be correlated and cross-referenced through largely manual processes.

The starting point of the design is the DoD Standards-based Architecture Planning Guide, Volume 4 of the TAFIM. This document introduced a comprehensive conceptual model for describing enterprise architectures that includes both organizational and technological components along with the relationships among them:

The intent of this model is to provide a structure for representing an enterprise architecture in enough detail to support strategic decision-making about future technology investment. When fully instantiated, this enterprise architecture provides guidance to the engineers who develop and maintain detailed system architectures for specific automated systems. Thus, the enterprise architecture focuses on the logical dependencies between an enterprise and its technologies, rather than on the physical connectivity between system components.

To develop and maintain such a model, a wide variety of information about the current enterprise architecture must be collected and analyzed. The TAFIM also provides detailed guidance about what information should be collected, and it supplies detailed examples of data collection forms for this purpose. Unfortunately, the linkage between these forms and the enterprise architecture model is not fully defined, and there are many implicit relationships between the forms that do not appear in the model at all. Therefore, a more detailed data model is required to implement an effective database for storing TAFIM-compatible enterprise architecture data.

Furthermore, there is a need to improve the value of this hard-to-collect information, and a relational database could be used as the information repository. If properly designed, a database could help answer a wide range of strategic questions about the current state and direction of an enterprise architecture. A database can be used to relate real world information which is frequently incomplete, estimated and inconsistent. The data structure needs to make collecting and saving disconnected lists of information easy and analysis inexpensive. Furthermore, it could form the basis of a reusable tool for the development and cross-comparison of multiple architectures for many different companies and organizations.

SUMMARY OF THE INVENTION

It is, therefore, an object of the invention to provide an enterprise architecture database capable of substantially overcoming the above-identified problems and substantially meeting the above-identified needs.

It is another object of the present invention to provide a unique data structure useable with a database program which can be used to help solve real world problems.

These and other objects of the present invention are achieved by providing a memory for storing data for access by a database program being executed on a computer system for evaluating an enterprise architecture. A data structure is stored in the memory with the data structure including information resident in a database used by the database program. The data structure includes a work flow model, an information model, and a technology model. The models are linked by the entities stored by the database program. The computer system executes the database program for evaluating the linkages between entities and how architectural changes to the enterprise affect the enterprise architecture by accessing the memory storing the data structure, and generates a result indicative of the linkages between entities.

These and other objects of the present invention are achieved by providing a computer implemented method for storing data for access by a database program being executed on the computer for evaluating an enterprise architecture. Entities are defined within at least one of a work flow model, an information model and a technology model. Data is classified and input into a work flow model, an information model and a technology model with each of the models having entities with each of the entities having at least one attribute. Each of the entities of the work flow model, the information model and the technology model are linked defining relationships between the linked models. The linked entities are stored and data is input on a storage device associated with a computer having a database program. The database program is capable of allowing users to input and search for how architectural changes to the enterprise affects the enterprise architecture. A screen is generated on which a user inputs a search to show the impact that a specific entity has on the enterprise architecture.

These and other objects of the present invention are achieved by providing an enterprise architecture database which includes a data structure comprising a work flow model including a plurality of entities, an information model including a plurality of entities; and a technology model including a plurality of entities. A database program is provided for managing the data structure to allow users to input and search for how architectural changes to the enterprise affects the enterprise architecture.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and data structure for storing, analyzing and displaying enterprise architecture information according to the present invention are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

HARDWARE OVERVIEW

Figure 1:
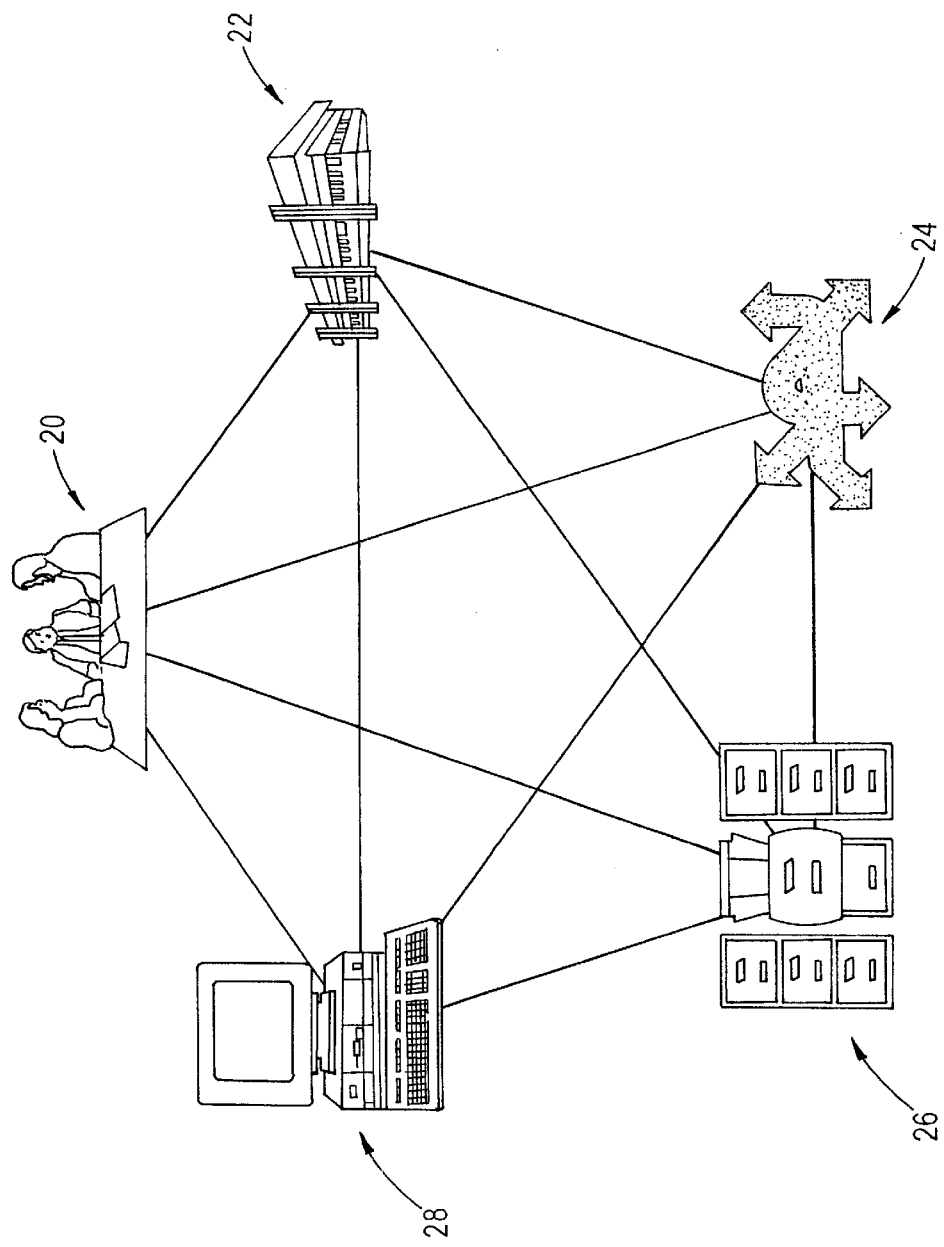
FIG. 1 is a schematic illustration of an enterprise architecture depicting the interrelationships between people, locations, information, infrastructure and processes.
Figure 2:
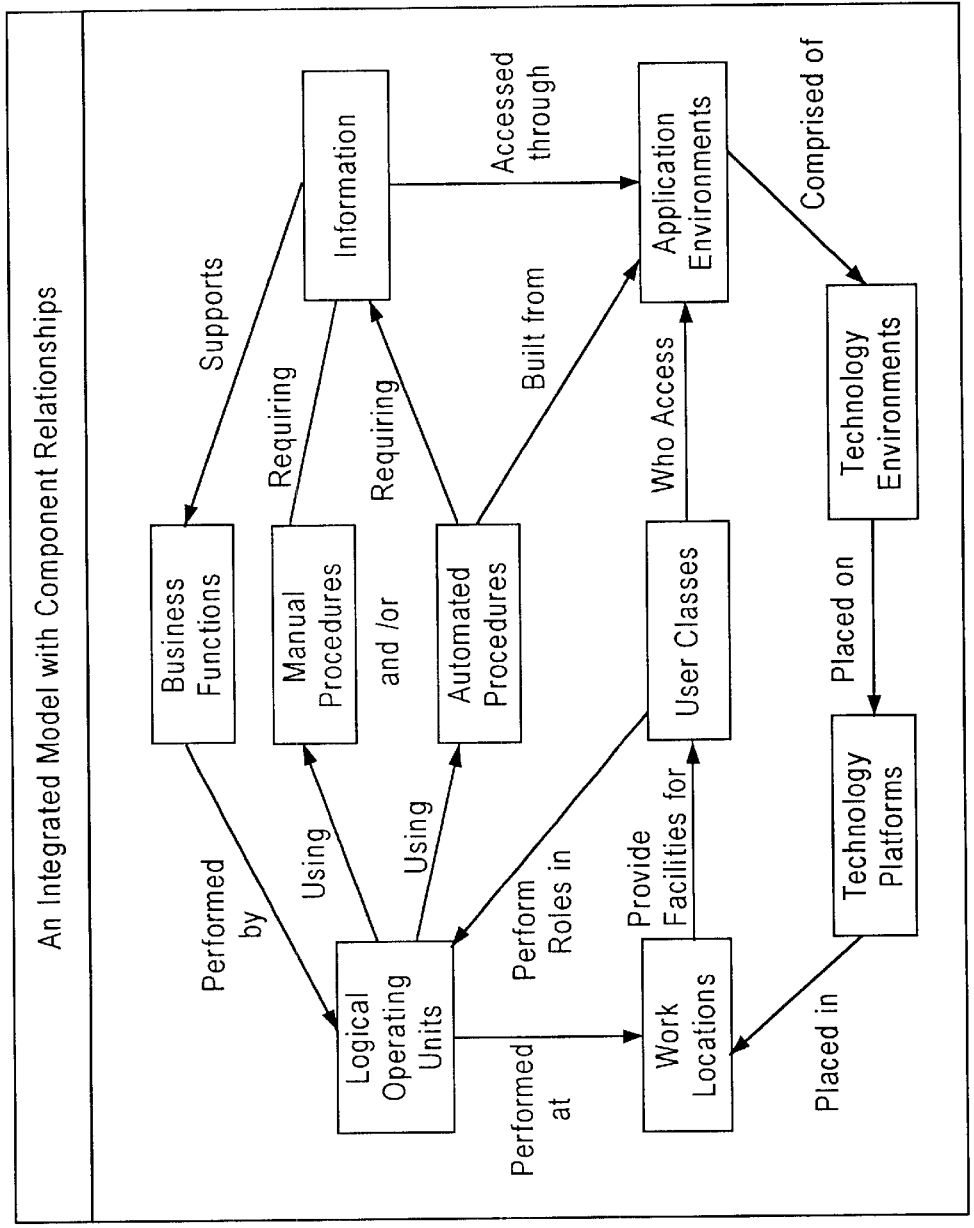
FIG. 2 is a prior art diagram of the TAFIM Enterprise Architecture Model.
Figure 3:
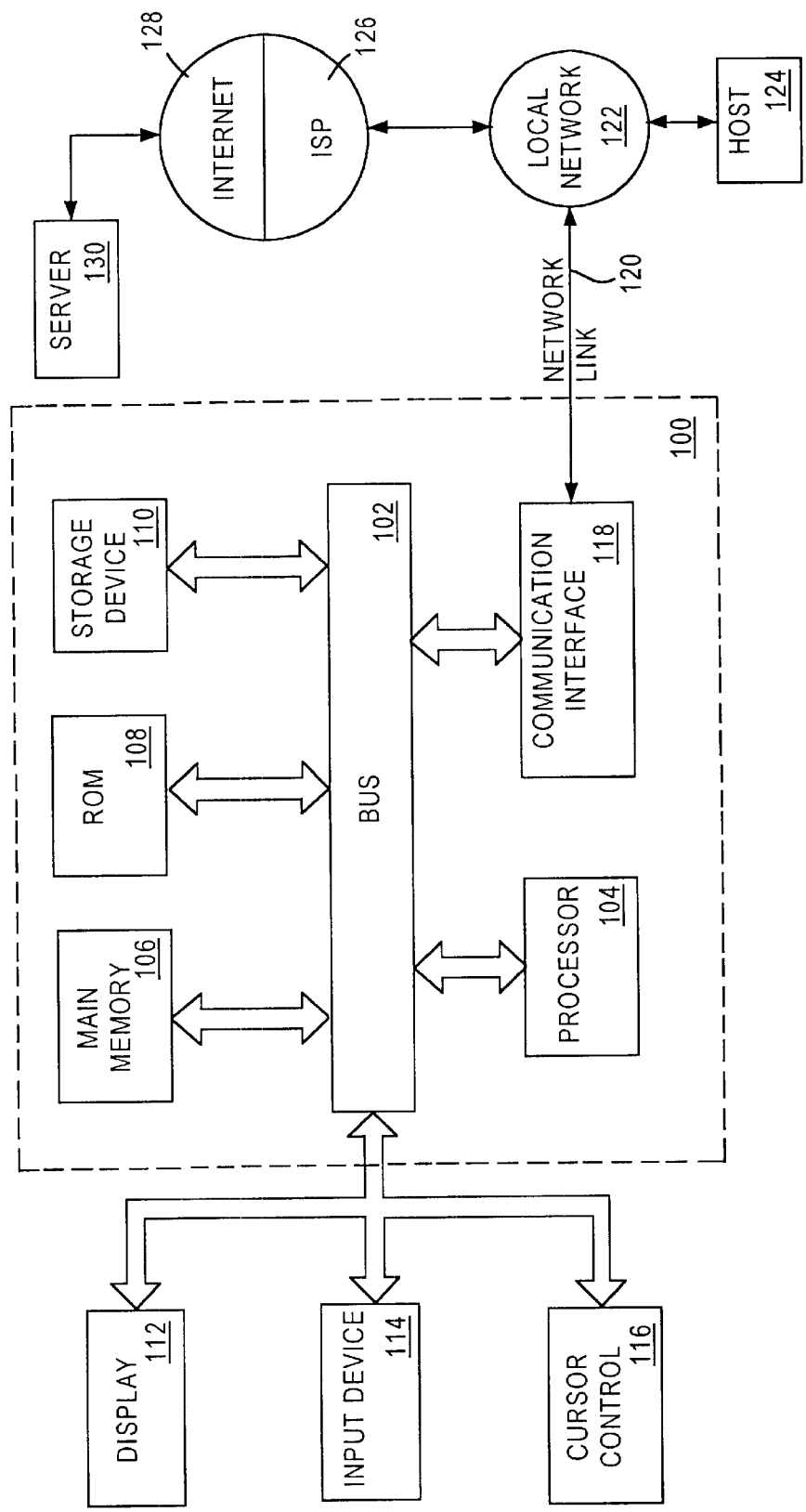
FIG. 3 is a high-level block diagram of a computer system in which the present invention can be implemented.

FIG. 3 is a block diagram illustrating an exemplary computer system 100 upon which an embodiment of the invention may be implemented. The present invention is usable with currently available personal computers, mini-mainframes and the like.

Computer system 100 includes a bus 102 or other communication mechanism for communicating information, and a processor 104 coupled with the bus 102 for processing information. Computer system 100 also includes a main memory 106, such as a random access memory (RAM) or other dynamic storage device, coupled to the bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to the bus 102 for storing static information and instructions for the processor 104. A storage device 110, such as a magnetic disk or optical disk, is provided and coupled to the bus 102 for storing information and instructions.

Computer system 100 may be coupled via the bus 102 to a display 112, such as a cathode ray tube (CRT) or a flat panel display, for displaying information to a computer user. An input device 114, including alphanumeric and other keys, is coupled to the bus 102 for communicating information and command selections to the processor 104. Another type of user input device is cursor control 116, such as a mouse, a trackball, or cursor direction keys for communicating direction information and command selections to processor 104 and for controlling cursor movement on the display 112. This input device typically has two degrees of freedom in two axes, a first axis (e.g., x) and a second axis (e.g., y) allowing the device to specify positions in a plane.

The invention is related to the use of a computer system 100, such as the illustrated system, to display enterprise architecture information. According to one embodiment of the invention, enterprise architecture information and display is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 106 causes the processor 104 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to the bus 102. Communication interface 108 provides a two-way data communication as is known. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. In the preferred embodiment communication interface 118 is coupled to a virtual blackboard. Wireless links may also be implemented. In any such implementation, communication interface 118 sends and receives electrical, electromagnetic or optical signals which carry digital data streams representing various types of information. Of particular note, the communications through interface 118 may permit transmission or receipt of the enterprise architecture information. For ex ample, two or more computer systems 100 may be networked together in a conventional manner with each using the communication interface 118. This would enable a database program to be stored on one computer and a client program that provides a user interface for entering information or entering/invoking queries on another computer.

A FRAMEWORK FOR COMPILING AND ANALYZING ENTERPRISE ARCHITECTURE INFORMATION

Each implementation of the present invention includes a framework for compiling and analyzing enterprise architecture information. The framework is depicted in an entity-relationship diagram. The framework is a way of generically organizing information about specific information models. Accordingly, data structures are implemented in conformance with the framework define a set of data types, describing how entities within the information models are interrelated, and ultimately how results are obtained.

A framework for an enterprise architecture database has been developed to meet several objectives:

Support the recording of all significant TAFIM enterprise architecture data elements and their relationships Facilitate the analysis of enterprise architecture data over time Provide for the representation of planned or possible future architectures Extend gracefully to encompass alternative (non-TAFIM) or future perspectives on technologies, services, etc.

Figure 6:
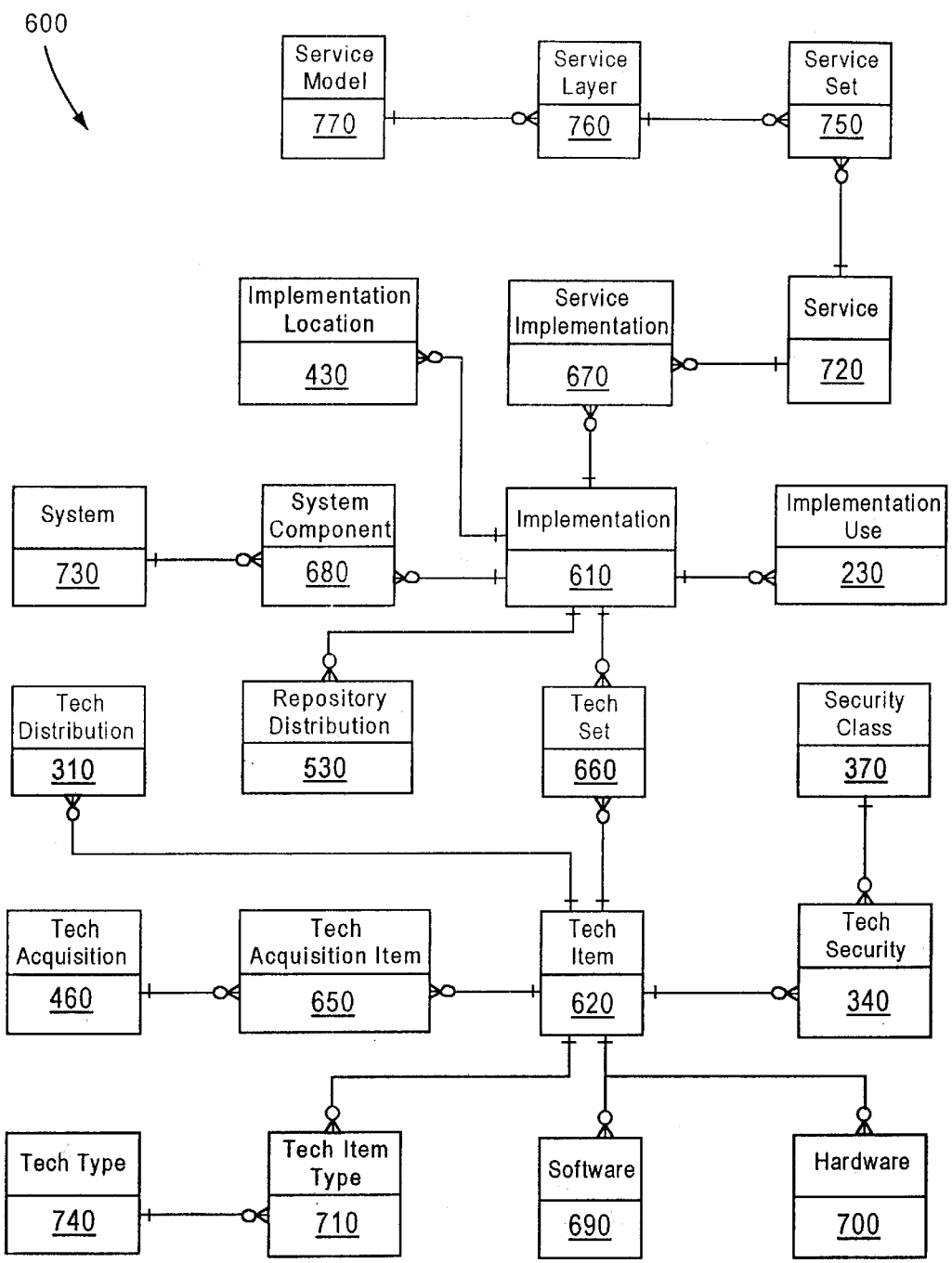
FIG. 6 is a diagram of a technology architectural entity-relationship model employed by an embodiment of the invention.
Figure 7:
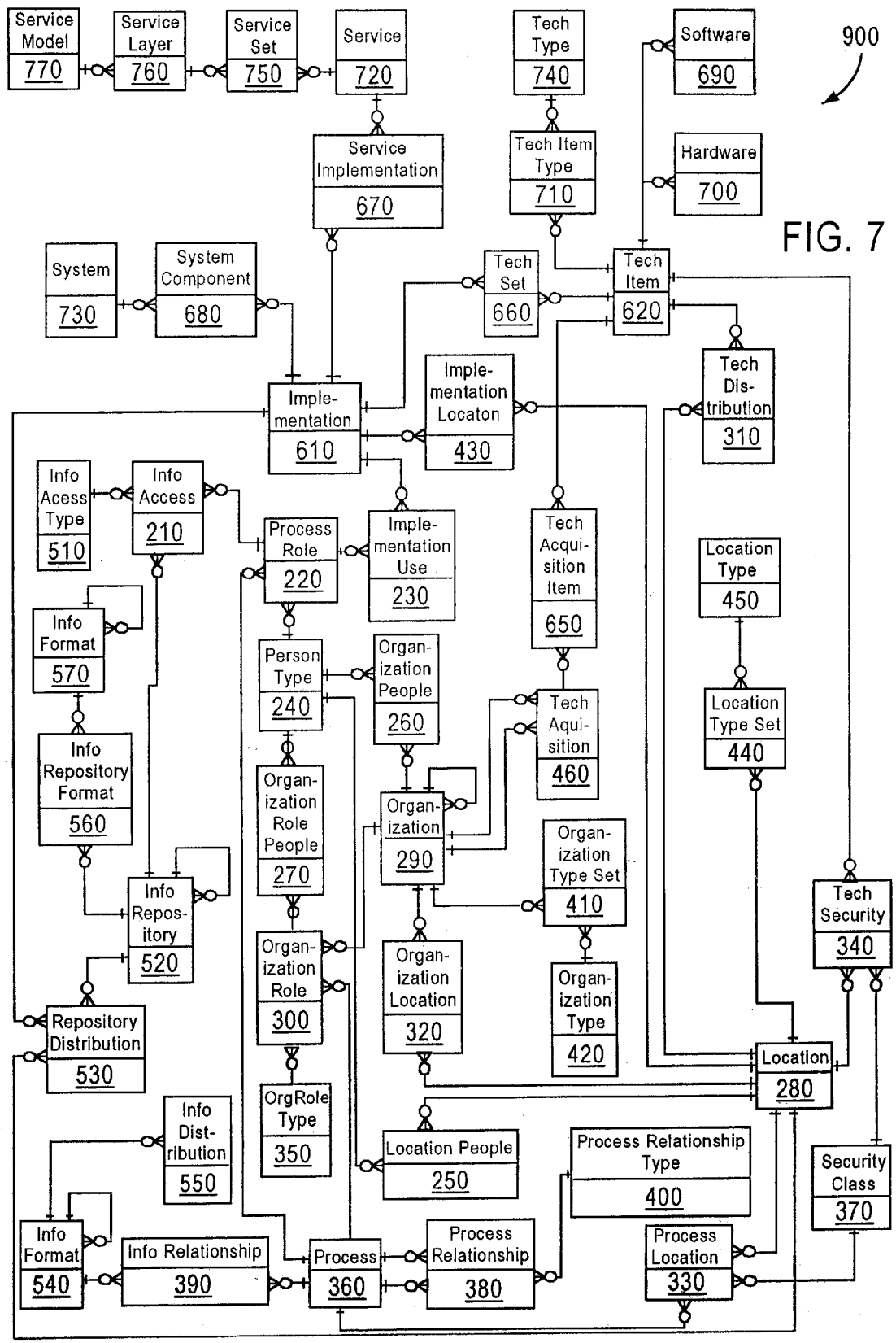
FIG. 7 is a diagram combining the models of FIGS. 4–6 into an enterprise architecture framework.

This framework can be described using an entity-relationship (ER) diagram. Each entity represents a set of categories, components, or associations between components of the enterprise architecture; each relationship specifies the logical dependency between a pair of entities as depicted in FIG. 7 which is a combination of FIGS. 4–6. The complete framework can be broken down into subsets that roughly correspond to the logical order in which an architect would need to define entities:

Enterprise-independent Categories, entities that define abstract types for other entities. These abstract types are a kind of meta-knowledge about other entities that is likely to be fully reusable by different enterprises (e.g., information access types or security classifications). These entities will change at most slowly over time (chiefly by the addition of new abstract types). These entities as described above are information access types, information formats, process relationship types, security classifications, service models, service layers, services, and technology types.

Enterprise-dependent Categories, entities that define abstract types for other entities and that are likely to be different between enterprises (e.g., types of people). These entities will change at most slowly over time. The distinction between this group of entities and the first group is not crisp but simply highlights a general expectation about how reusable this knowledge will be across different architectures. These entities as described above are information types, organization role types, and types of people.

Architecture Components, entities that identify fundamental components of an enterprise architecture (e.g., organizations, processes, technology items, etc.). Instances of these entities are either tangible things or are otherwise uniquely identifiable independently of other component entities. For example, an organization can be identified independently of the systems or processes it uses. Attributes and relationships of these entities are likely to change significantly over time in ways that are important to the architect and planner. These entities as described above are implementations, information repositories, locations, organizations, processes, systems, and technology items (software and hardware).

Architecture Component Associations, entities that identify associations or relationships between enterprise components (e.g., technology distribution over locations). Instances of these entities cannot be identified independently from the component entities they interrelate; therefore, they must be the last parts of an enterprise architecture to be specified. Attributes and relationships of these entities are likely to change significantly over time in ways that are important to the architecture and planner. These entities as described above are implementation use, information access, information distribution, information relationships, information repository formats, location people, organization locations, organization people, organization roles, organization role people, process locations, process relationship, process roles, repository distributions, service implementations, system components, technology acquisitions, technology acquisition items, technology distribution, technology item types, technology security, and technology sets.

To improve understanding of the foregoing collection of identified entities, these can be structured more naturally into major enterprise oriented segments: work flow, information and technology. These are referred hereinafter as models. A data structure is built using these models. The information placed in those data structures (e.g., information about specific organizations, technology, etc.) constitutes an enterprise architecture.

Figure 4:
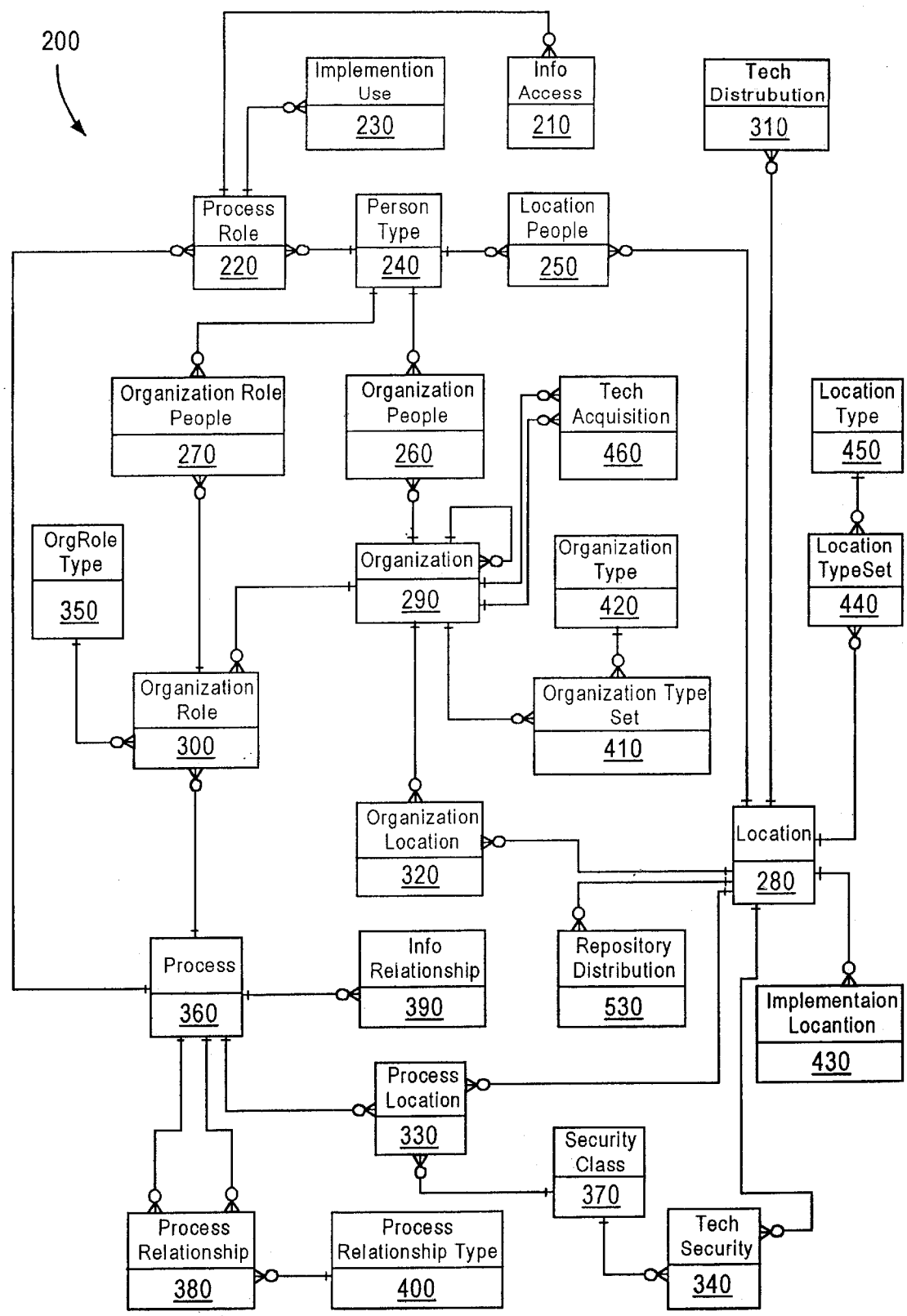
FIG. 4 is a diagram of a work flow architecture entity-relationship model employed by an embodiment of the invention.
Figure 5:
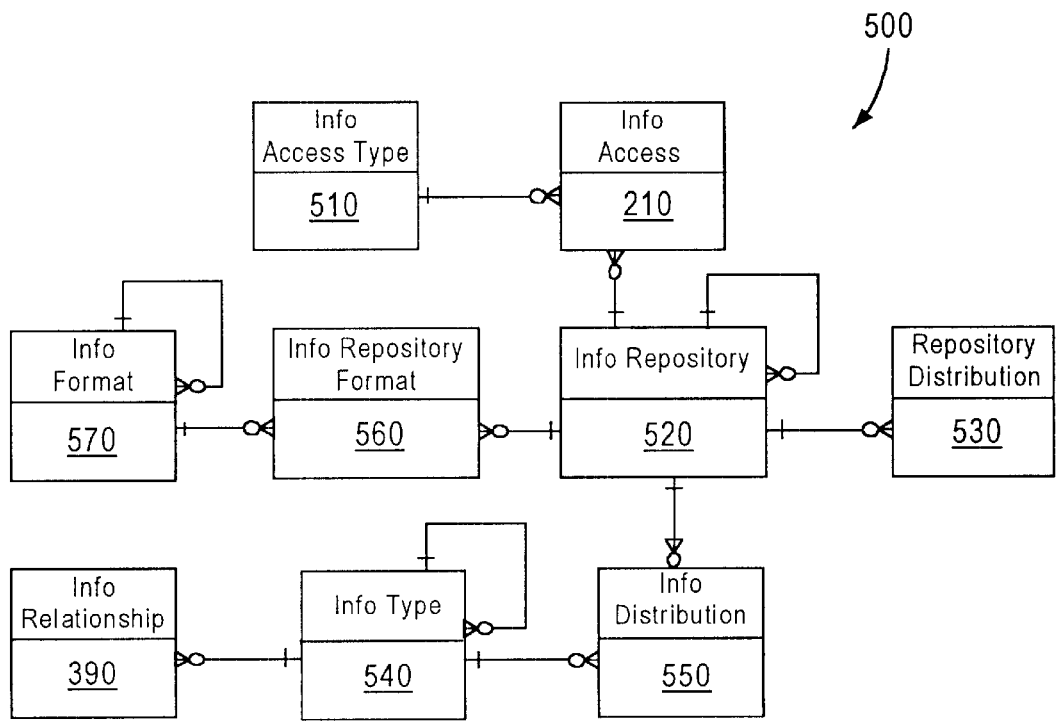
FIG. 5 is a diagram of an information architecture entity-relationship model employed by an embodiment of the invention.

Referring to FIG. 4, depicted is a data structure of a work flow model 200 according to the present invention. Examples of information included in the work flow model 200 include descriptions of the organizations, processes and locations and the relationships between them. In FIG. 5, depicted is a data structure of an information model 500. Examples of information included in an architecture include the types of information that the enterprise uses, the formats of the information, the types of repositories that the information is stored in, and so forth. In FIG. 6, depicted is a data structure of a technology model or architecture 600. Common examples of information included in a technology architecture include the hardware and software that support the enterprise. FIG. 7 combines the data structures of FIGS. 4–6 into an overall enterprise architecture model 900.

In each Figure, relationships between two data entity objects have a property called "cardinality". Cardinality denotes the number of entities that can exist on each side of a relationship. Across a relationship there are basically three kinds of cardinality: one-to-one, one-to-many, and. manyto-many. In the entity-relationship diagrams, data entities are represented by rectangular boxes containing the name of the data object or event. Relationships between the data entities are represented by connecting lines, and the ends of these lines can may be marked to show cardinality. On each side of a relationship, if there is only one entity on a given side, the connecting line on that side is noted with a bar. In FIG. 4, for example, there is a bar adjacent the process role entity on the line connecting entity to info access entity. Many-to-one relationships between data entities in the data structure are indicated by an interconnecting line with an inverted "V" on the many side. For example, in FIG. 4, process role entity may have many information accesses entities. To include the possibility that two entities may be related, but not in all instances, the connecting line is additionally marked with a small circle. The connecting line between process role entity and implementation use is marked with a circle adjacent the implementation use entity.

According to one embodiment, the. data structures for the models 200, 500 and 600 are implemented within a relational database. Models 200, 500 and 600 together define the framework 900. Each data type in the models 200, 500 and 600 corresponds to a table in the relational database, each instance of a data type is stored as a row or "entry" in a table corresponding to the type, and the fields of each data correspond to columns in the corresponding table. Persons of skill in the art would readily recognize that the models 200, 500 and 600 may be implemented in a variety of ways other than with a relational database, for example, by a collection of persistent objects, defined with an object-oriented language such as C++, Smalltalk, and Java, or files of records or structures of a procedural language such as C, Pascal, Ada, BASIC, FORTRAN, COBOL, PL/I, and the like.

WORK FLOW ARCHITECTURE MODEL

The work flow model 200 is depicted in FIG. 4 and includes a plurality of entities. An information access entity 210 includes information recording the relationship between a particular process role information access type, and information repository, as well as other access-specific attributes (e.g., frequency of this type of access). To perform different roles in support of an enterprise process, people working in the enterprise need to be able to access information in repositories in different ways. For example, a timesheet entry clerk performing a data entry role needs to "create" access to a labor hours data repository on a weekly basis. A primary key uniquely identifies each instance of this entity by combining three keys inherited from the process role entity 220, information access type 510 (FIG. 5), and information repository entity 520 (FIG. 5). Each information access entity 210 must be associated with exactly one instance of each of these entities 220, 510, 520. The attributes of the information access entity are its frequency (number) and an explanatory annotation (text). This entity is necessary to represent the relationship between process roles and information repositories; and it stands as a common link between the work flow model 200 and the information model 500 of the enterprise architecture model 900 (FIG. 7).

A process roles entity 220 is depicted in FIG. 4 which entity records the relationship between a particular process, implementation use, information access, and type of person, as well as the number of people of that type who are performing that role. The execution of enterprise processes involves different types of people using a variety of automated information services and accessing multiple information repositories. For example, a human resources specialist may update resumes in a resume database using a certain combination of Commercial Off the Shelf (COTS) products. Each instance of this entity is uniquely identified by a primary key using an arbitrary integer. The attributes of a process role are a quantity (integer) and an explanatory annotation (text). The process role entity 220 uses a process entity 360 and a type of people entity 240; each process role must have exactly one of each of these entities. The process role entity 220 is used by the information access entity 210 and implementation use entity 230; each of these associates a process role with some number of other entities. This entity provides an opportunity to record quantities of different types of people involved with an enterprise architecture (in addition to an organization people entity 260 and location people entity 250). The reason for this potential redundancy is that such information may be difficult to acquire and is likely to be collected or estimated in different ways by different enterprises. The process role quantity supports the association of quantities of people with specific processes.

An implementation use entity 230 records a relationship between a particular process role and an implementation. People in an organization perform process roles, and rely upon implementations of one or more automated services to perform these process roles. A primary key uniquely identifies each instance of this entity 230 by a combination of two keys inherited from the process role entity 220 and implementation entity 610 (FIG. 6). The only attribute of the implementation use entity 230 is an explanatory annotation (text). Each implementation use instance must be associated with exactly one instance of each of the process role entity 220 and the implementation entity 610. The implementation use entity 230 stands as a common link between the work flow model 200 and the technology model 600 of the enterprise architecture model 900 (FIG. 7).

A types of people entity (persontype) entity 240 is used by the enterprise architect to be able to distinguish between different types of people when analyzing or developing an architecture. These categories may be very broad (e.g., "manager") or very specific (e.g.,"time sheet entry clerk";), and they need not be exclusive: there may be many individuals who conform to multiple types. A complete set of such types of people can readily be generated by the enterprise architect depending on the particular organization being analyzed and need not be further elaborated on herein. Each instance of this entity 240 is uniquely identified by a primary key having an arbitrary integer. The attributes of the person type entity 240 are its name and a textual description. The person type entity 240 is used by a location people entity 250, an organization people entity 260, an organization role people entity 270, and the process role entity 220. It would also be possible to link types of people into some kind of hierarchical or lattice structure not described herein.

A location people entity 250 is used to record the quantity of each type of person at each enterprise location. Because individuals can have more than one type, the sum of this quantity at a given location may be larger than the number of individuals at that location because the various types of people in an enterprise are distributed unevenly at different locations. Each instance of this entity is uniquely identified using a primary key by a combination of two keys inherited from the location and type of person entities. The attributes of the location people entity 250 are a quantity (integer) and an explanatory annotation (text). Each location people instance must be associated with exactly one instance of each of these entities. The location people entity 250 is necessary to represent the relationship between a location entity 280 and the types of people entity 240. Recording the number of different types of people at each location is not necessary for specifying an enterprise architecture but may be useful to decision makers. The location people entity 250 and organization people entity 260 were both included in this database because information about quantities of different types of people in an enterprise may be difficult to collect, and when available it is likely to be associated either with locations or organizations, but not with both.

An organization people entity 260 records the relationship between each organization and the types of people who work in it, as well as the number of each type of person. (Because individuals can have more than one type, the sum of this quantity in a given organization may be different than the number of individuals in that organization.) Each instance of this entity is uniquely identified by a primary key using a combination of two keys inherited from the organization and type of person entities. The attributes of the organization people entity 260 are a quantity [number of people of some type in an organization] (integer) and an explanatory annotation (text). Each organization people instance must be associated with exactly one instance of each of an organization entity 290 the types of people entity 240.

The organization role people entity 270 is as follows. For any given process, the role played by an organization with respect to that process may be restricted to certain types of people. For example, an organization may be represented as a customer of a process that generates a monthly report, but within that organization perhaps only a certain level of managers actually uses the report. In that case, the organization role people entity 270 can record this restricted relationship, along the number of people of that type who fill that role in the organization. Each instance of this entity is uniquely identified by a primary key using a combination of two keys inherited from an organization role entity 300 and the types of people entity 240. The attributes of the organization role people entity 270 are a quantity of people [performing an organization role](integer), a quantity of person years per year expended on this effort (single), an average cost per person year for this type of person in this role (currency), and an explanatory: annotation (text). Each organization role people instance must have exactly one instance of each of the organization role entity 300 and type of people entity 240. This entity 270 is useful for estimating process costs.

The locations entity 280 is used to. show the locations which are the places where an enterprise conducts its activities. The TAFIM recommends collecting many elements of information to baseline an enterprise architecture; a large number of these are related to enterprise locations, especially the information repositories, organizations, processes, and technology items. Each instance of the locations entity 280 is uniquely identified by an arbitrary, integer. The attributes of a location entity 280 are its name, a textual description, and a textual comment. The location entity 280 is used by the repository distribution entity 530, technology distribution entity 310, organization location entity 320, process location entity 330, and technology security entity 340; each of these entities associating the locations entity 280 with some combination of other entities.

The organizations entity 290 models the organization structure. Almost every enterprise has hierarchical organization charts that partition the enterprise into groups of people. These partitions represent distinctions of function, customer, and/or location throughout the enterprise. It is important to note that not all organizations in an enterprise architecture model are necessarily part of the enterprise itself; for example, they may be external customers or suppliers. Each instance of the organizations entity 290 is uniquely identified by an arbitrary integer. The attributes of the organization entity 290 are its name and a textual comment. The organization entity is used by the organization location entity 320, organization people entity 260, and organization role entity 300; each of these associates an organization with some number of other entities. Also, to represent the hierarchical structure of organizations, each organization may be a part of another organization. The organization entity 290 is an essential component of the enterprise, work flow architecture. Organizations are often modeled as having relationships directly with other organizations (beyond their hierarchical structure); for example, one organization may be a customer of another organization. However, these relationships should always exist in the context of some process that involves both organizations. Since the model according to the present invention also includes process as an explicit entity, organization relationships are included indirectly as a pair of relationships between organizations and processes (i.e., organization roles).

The organization roles entity 300 describes how the organizations within an enterprise interact with each other through many processes. For a given process, one organization may perform it, another may monitor it, others may act as customers or suppliers, and so on. The organization role entity 300 records this relationship between a particular organization role type, organization, and process. In some cases, a particular role may be restricted to certain types of people within an organization. Each instance of this entity is uniquely identified by a primary key using an arbitrary integer. The only attribute of an organization role is an explanatory annotation (text). Each organization role entity 300 must be associated with exactly one instance of an organization role type entity 350, organization entity 290, and process entity 360. Also, the organization role entity 300 may be used by the organization role people entity 270. Each organization role people instance must have exactly one organization role. This entity 300 is necessary to represent the relationship between organizations and processes.

The technology distribution entity 310 is depicted in FIG. 5. Each enterprise uses a range of technology items at different locations. The technology distribution entity records this relationship between the technology item and location entities, along with the quantity of each item at or in use at each location. Each instance of this entity is uniquely identified by a primary key using a combination of two keys inherited from the technology item and locations entities. The attributes of the technology distribution entity 310 are a quantity [of that item at that location] (integer) and a user count [of people who use that item at that location] (integer). The technology distribution entity 310 uses the technology item entity 620 and location entity 280; each technology distribution must be associated with exactly one of each of these entities. This entity is necessary to represent the relationship between technology items and locations. It could be argued that this relationship should exist between technology acquisitions and locations; after all, almost all technology items used by an enterprise are acquired prior to use. However, the realities of collecting baseline enterprise architecture data suggest that it is reasonably straightforward to inventory what technology items are in which locations, whereas determining technology distribution based upon a history of technology acquisitions may require an enterprise-wide paper trail that is incomplete or non-existent.

The organization locations entity 320 records the relationship between each organization and the locations where it works, as well as the number of people in the organization at each location. (Because individuals can possibly be affiliated with more than one location, the sum of this quantity in a given organization may be different than the number of individuals in that organization.). Each instance of the organization locations entity 320 is uniquely identified by primary key using a combination of two keys inherited from the organization entity 290 and location entity 280. The attributes of an organization location entity 320 are a quantity [number of personnel at that location] (integer) and an explanatory annotation (text). Each organization location entity 320 must be associated with exactly one instance of each of the location entity 280 and organization entity 290. This entity is necessary to represent the relationship between organizations and locations. Recording the number of people in an organization at each location is not necessary for specifying an enterprise architecture but may be useful to decision makers.

A process locations entity 330 is used to record that processes executed by an enterprise are performed at different locations with different security requirements. The process location entity 330 records this relationship between each process and the locations where it is performed, along with the security classification required for that activity. Each instance of this entity is uniquely identified by primary key using a combination of three keys inherited from a process entity 360, location entity 280, and a security classification entity 370. The only attribute of a process location is an explanatory annotation (text). Each process location must be associated with exactly one instance of each of the a process entity 360, location entity 280, and a security classification entity 370.

The technology security entity 340 records the relationship between each technology item and the locations where it is used, along with the security classification associated with that use. This is because the technology items used by an enterprise are employed at different locations with different security requirements. Each instance of the technology security entity 340 is uniquely identified by a combination of three keys inherited from a technology item entity 620, location entity 280, and security classification entity 370. The only attribute of the technology security entity 340 is an explanatory annotation (text). Each technology security instance must be associated with exactly one instance of each of the technology item entity 620, location entity 280, and security classification entity 370.

The organization role types entity 350 identifies which organizations within an enterprise may have different types of roles with respect to a given process. For example, one organization may be the executor of a process for another organization which is a customer. There is a limited set of such roles associated with any one enterprise which can be specified here. Each instance of the organization role types entity 350 is uniquely identified by an arbitrary integer. The attributes of an organization role type are its name and a textual description. The organization role type entity 350 is used by the organization role entity 300. This entity is required only if one wishes to maintain an extensible standardized list of organization role types.

The processes entity is depicted at 360. A process is an enterprise activity defined by what the enterprise does during that activity, the information it uses, the organizations and locations it involves, and the result it produces. At a high level of description it is more conventional to refer to these activities as function rather than as processes. Functions are the principal strategic activities of an enterprise. They are often specified in a hierarchical structure; the enterprise as a whole performs some single function or a limited set of major functions, which can each be broken down into subfunctions, and so on. A function simply describes what an enterprise does, independently of the who, where, and how of those activities. For example, one function of an enterprise may be to market its products/services to its customers. This may involve subfunctions of customer analysis, direct customer contact, proposal generation, advertising, and so on. At some point these functions cannot be further distinguished without reference to specific; enterprise information, organizations, and locations. At this level of description (functions in some specific context within the enterprise), the activities are processes. A pure function definition specifies what an enterprise does independently of any other part of the model, while processes are intertwined with information, locations, and organizations. The process entity can therefore record these activity descriptions at any desired level of abstraction; pure "function" processes will have relationships only with other process entities, while lower-level processes will have relationships with at least some non-process entities. Each instance of the process entity 360 is uniquely identified by an arbitrary integer. The attributes of a process are a text identifier, a textual description of its activity, a textual description of its method, and a textual description of its result (which should be a tangible product or measurable service; information results should be identified through an information relationship). The process entity 360 is used by a process relationship entity 380 with each process relationship links two processes. The process entity 360 is used by an information relationship entity 390, organization role entity 300, process role entity 220; and process location entity 330. This entity is an essential part of the enterprise work flow architecture.

The security classifications entity 370 identifies the different security classifications of the information used across enterprise locations, processes, and technology items. However, outside of the DoD context the concept of security classification may have different uses or definitions. Therefore, these types may include DoD-oriented classifications (e.g., unclassified, confidential, secret, etc.).and/or alternative classifications (e.g., company sensitive, personal access only, etc.). Each instance of this entity is uniquely identified by a primary key using an arbitrary integer. The attributes of a security classification are its name and a textual description. The security classification entity 370 is used by the technology security entity 340 and process location entity 330. Each instance of the technology security entity 340 and process location entity 330 must have exactly one security classification. (Multiple classifications can be represented by multiple instances.)

The process relationship entity 380 shows how the processes performed by an enterprise are interrelated in different ways. At a high level of abstraction that specifies broad enterprise-level functions, processes may only be related hierarchically (a given process can be part of one other process). At lower levels of detail, some processes may be shared by other processes. Also, processes may have other types of relationships that describe their interdependencies; process A may produce information for process B, or process C must be synchronized with process D. The process relationship entity records specific relationships between different processes. Each instance of the process relationship entity 380 is uniquely identified by a combination of three keys, one inherited from the process relationship type entity 380 and two inherited from the process entity 360 (i.e., a process relationship exists between two processes, identified as a "From" process and a "To" process.) The process relationship entity 380 has no non-key attributes. The process relationship entity 380 uses a process relationship type entity 400 and process entity 360. Each process relationship instance must be associated with exactly one relationship type and two processes.

The information relationships entity 390 describes how the different types of information used by an enterprise are produced (output) or consumed (input) by many different process. The information relationship entity 390 records the relationship between a particular information type and process, including attributes that specify whether that relationship includes input, output, or both properties. Each instance of the information relationships entity 390 is uniquely identified by a combination of two keys inherited from the information type entity 540 (FIG. 5) and process entity 360. The attributes of the information relationship entity 390 are an input predicate (binary), an output predicate (binary), and an explanatory annotation (text). Each information relationship entity 390 must be associated with exactly one instance of each of the information type entity 540 (FIG. 5) and process entity 360. The information relationships entity 390 is necessary to represent the relationship between information types and processes. If more types of information relationships are desired (besides input and output), then the two binary attributes of this entity could be replaced with a single text attribute or even by a separate entity (i.e., an information relationship type entity). The information relationship entity 390 stands as a common link between the work flow model and the technology model of the enterprise architecture.

The process relationship types entity 400 describes how the processes performed by an enterprise are interrelated in different ways. At a high level of abstraction that specifies broad enterprise-level functions, processes may only be related hierarchically (a given process can be part of one other process). At lower levels of detail, some processes may be shared by other processes. Also, processes may have other types of relationships that describe their interdependencies; process A may produce information for process B, or process C must be synchronized with process D. The process relationship type (entity) table allows the enterprise architect to identify the range of ways processes can be related. Each instance of the process relationship types entity is uniquely identified by an arbitrary integer. The attributes of a process relationship type are simply its name and a textual description. The process relationship type entity 400 is used by the process relationship entity 380; every process relationship must have exactly one relationship type.

An organization type sets entity 410 is depicted in FIG. 4. The different organizations associated with the work of an enterprise have different types. These categorizations allow the enterprise architect to determine the organizational distribution of the architecture in groupings that fall between those of individual organizations and those of the entire enterprise. The organization type set entity 410 records this many-to-many relationship between particular organizations and organization types. Each instance of this entity is uniquely identified by a primary key using a combination of two keys inherited from the organization type entity 420 and organization entity 290. The only attribute of an organization type set is an explanatory annotation (text). The organization type set entity 410 uses the organization type entity 420 and organization entity 290; each organization type set instance must be associated with exactly one instance of each of these entities. This entity is necessary to represent the relationship between organization types and organization.

An organization types entity 420 is depicted in FIG. 4. Many different internal and external organizations are usually involved in the activities of a typical enterprise. It is likely that those organizations can be grouped into different categories using enterprise-dependent criteria (e.g., functional responsibilities, customer groups, geographic areas, etc.) There is a limited set of such organization types associated with any one enterprise, and they can be specified here. Each instance of this entity is uniquely identified by a primary key using an arbitrary integer. The attributes of an organization type are its name and a textual description. The organization type entity 420 is used by the organization type set entity 410; these associate organization types with specific organizations.

An implementation locations entity 430 is depicted in FIG. 4. The implementations used within an enterprise are available at different locations. The implementation location entity records this simple relationship between each implementation and the locations where it is used, as well as the number of people who use each implementation at each location. (Because individuals often use more than one implementation, the sum of this quantity across all implementations at a location may be different than the number of individuals at that location.) Each instance of this entity is uniquely identified by a primary key using a combination of two keys inherited from the implementation entity 610 and location entity 280. The attributes of an implementation location are a quantity [number of personnel at that location using that implementation] (integer) and an explanatory annotation (text). The implementation location entity 430 uses the location entity 280 and the implementation entity 610. Each implementation location must be associated with exactly one instance of each of these entities.

A location type sets entity 440 is depicted in FIG. 4. The different locations where an enterprise performs its work have different types. These categorizations allow the enterprise architect to retrieve the physical distribution of the architecture in groupings that fall between those of individual locations and those of the entire enterprise. The location type set entity 440 records this many-to-many relationship between particular locations and location types. Each instance of this entity is uniquely identified by a primary key using a combination of two keys inherited from the location type entity 450 and location entity 280. The only attribute of an location type set is an explanatory annotation (text). The location type set entity uses the location type entity 450 and location entity 280; each location type set instance must be associated with exactly one instance of each of these entities. This entity is necessary to represent the relationship between location types and locations.

A location types entity 450 is depicted in FIG. 4. When enterprises perform their functions at multiple locations, it is likely that those locations can be grouped into different categories using enterprise-dependent criteria (e.g., geographic area, customer groups, etc.) There is a limited set of such location types associated with any one enterprise, and they can be specified here. Each instance of this entity is uniquely identified by a primary key using an arbitrary integer. The attributes of a location type are its name and a textual description. The location type entity 450 is used by the location type sets entity 440. This entity associates location types with specific enterprise locations.

A technology acquisitions entity 460 is depicted in FIG. 4. Multiple organizations within an enterprise may acquire a variety of technology items and pay different amounts for the same items over a variety of time periods. The technology acquisition entity records this relationship between the organization entity 290 and technology acquisition item entity 650 (FIG. 6), along with the useful date and cost information about each acquisition. Each instance of this entity is uniquely identified by a primary key using an arbitrary integer. The attributes of the technology acquisition entity 460 are an acquisition date, an expiration date (optional), a binary flag identifying whether the acquisition is a purchase (a non-purchase indicating a lease or license), a binary flag indicating whether the acquired technology can be used after its expiration date, a one time cost (currency), an annual cost (currency), and an explanatory annotation (text). The technology acquisition entity 460 uses the organization entity 290; each technology acquisition must be associated with exactly one acquiring organization. In addition, each technology acquisition may be associated with one supplying organization. Finally, this entity is used by the technology acquisition item entity 650, which associates technology acquisitions with one or more specific technology items. Although not an essential part of an enterprise architecture model, this cost and date information is very useful to information technology decision makers, so it makes, sense to make a place for this kind of information in the enterprise architecture database.

INFORMATION ARCHITECTURE MODEL

An information access types entity 510 is depicted in FIG. 5. The information access type (entity) table identifies the range of ways people can access information because people working on enterprise processes need to manipulate information in different ways. Some people create information that other people read or modify. The instantiation of this entity could list only the standard access types specified in the TAFIM (i.e., create, read, update, delete), or it may be extended to include more specialized access types (e.g., "administer" access could be defined to include the ability to change information structure in a repository). Each instance of this entity is uniquely identified by a primary key using an arbitrary integer. The attributes of an information access type are simply its name and a textual description.

The information access type entity 510 is used by the information access entity 210; every information access must have exactly one access type.

The information repositories entity 520 is depicted in FIG. 5. Most of the information used by an enterprise is distributed and stored in a number of different repositories. Each repository can contain different information types, use different formats, and require different access; and each can be built using different implementations or distributed across multiple locations. To help represent this complexity, a single repository can be instantiated as a hierarchy of component repositories, each with different relationships to other entities. Each instance of this entity is uniquely identified by a primary key using an arbitrary integer. The attributes of an information repository are its name, a size estimate (single), and a textual comment. The information repository entity 520 is used by the repository distribution entity 630 (FIG. 5), technology distribution entity 640, organization location entity 320, process location entity 330, and technology security entity 340; each of these associates a repository with some combination of other entities. Also, to represent the hierarchical structure of information repositories, each repository may be a part of another repository. This entity is an essential component of the enterprise information architecture. Representing repositories as a hierarchical structure may not be necessary, but it gives the architect some greater flexibility latitude for recording more detail about repositories when that would be useful.

A repository distribution entity 530 records the relationship between a particular information repository, implementation, and location. The various information repositories used by an enterprise are built upon different implementations that may be spread over multiple locations. Each instance of this entity is uniquely identified by a primary key using a combination of three keys inherited from the information repository entity 520, implementation entity 610, and location entity 280. The only attribute of an information distribution is an explanatory annotation (text). The repository distribution entity 530 uses the information repository entity 520, implementation entity 610, and location entity 280; each information distribution must be associated with exactly one instance of each of these entities. This entity is necessary to represent the relationship among information repositories, implementations, and locations. Since this entity represents a ternary (3-way) relationship, it could conceivably be split into two separate binary relationship entities (i.e., a repository location entity and a repository implementation entity). However, this approach would prevent the architect from directly specifying how distributed repositories might be implemented differently at multiple locations, and this is a potentially useful aspect of the enterprise information architecture. Therefore, the repository distribution entity was implemented as a ternary relationship.

The information types entity 540 is depicted in FIG. 5. A key part of any enterprise architecture is the structure of information used by the enterprise. This structure can be organized as a hierarchy of information types, with broad top-level types (e.g., customer data, financial data, personnel data, etc.) and successively more detailed subtypes (e.g., customer orders, business agreements, etc.). The TAFIM suggests a two-level hierarchy (general subjects and data groups), but more levels might be desirable in some cases. Each instance of this entity is uniquely identified by a primary key using an arbitrary integer. The attributes of the information type entity 540 are its name and a textual description. The information type entity 540 is used by the information relationship entity 390; these associate types of information with information repositories and processes, respectively. Also, to represent the hierarchical structure of information types, each information type may be a subtype of another information type. When information types are specified at high levels of abstraction, they tend to form a natural hierarchical structure; but at lower levels of abstraction (greater detail), they may form a lattice, with multiple supertypes for each subtype. However, since the objective here is to specify information architecture at the enterprise level, it is unlikely that such levels of detail will be necessary or even useful. Therefore, the information type entity 540 has been implemented to support only a hierarchical type structure.

An information distribution entity 550 is depicted in FIG. 5. The different information types used by an enterprise must be stored in different repositories. The information distribution entity records the many-to-many relationship between particular information repositories and the information types in them. Each instance of this entity is uniquely identified by a primary key using a combination of two keys inherited from the information type and information repository entities. The only attribute of an information distribution entity is an explanatory annotation (text). The information distribution entity 550 uses the information type entity 540 and information repository entity 520; each information distribution entity 550 must be associated with exactly one instance of each of these entities. This entity is necessary to represent the relationship between information types and repositories.

An information repository formats entity 560 is depicted in FIG. 5. Modern consolidated or distributed information repositories often contain data stored in a variety of formats. The information repository format entity records this many-to-many relationship between information repositories and information formats. Each instance of this entity is uniquely identified by a primary key using a combination of two keys inherited from the information repository entity and information format entities. The only attribute of this entity, is an explanatory annotation (text). An information repository format entity 560 uses an information format entity 570 and information repository entity 520; each information repository format instance must be associated with exactly on instance of each of these entities. This entity is necessary to represent the relationship between information formats and repositories. If it were feasible and desirable to associate only a single information format with a repository, then one could eliminate this entity by having the information repository include a foreign key from the information format entity.

An information formats entity 570 is depicted in FIG. 5. Information repositories can store enterprise information in a wide variety of formats. Some of these may correspond to distinct information encodings (e.g., JPEG imagery); others may encompass a wide variety of weakly specified formats (e.g., multimedia). Information formats may be specified as a hierarchy in which generalized format categories subsume more specific formats. Each instance of this entity is uniquely identified by a primary key using an arbitrary integer. The attributes of an information format are its name and a textual description. The information format entity 570 is used by the information repository formats entity 560; which associates information repositories with the formats of the information they contain. Also, to represent the hierarchical structure of information formats, each information format may be a identified as a kind of another information format.

TECHNOLOGY ARCHITECTURE MODEL

The implementations entity 610 is depicted in FIG. 6. Implementations are specific technology items or sets of items that provide one or more automated services to support some process role(s). Implementations are also the building blocks of automated systems. Implementations are identified and defined by the architect rather than by external organizations; they represent the architect's view of tightly-related groups of technology items. For example, a specific implementation of a standard e-mail service may include one vendor's server software and another vendor's client software. Each instance of this entity is uniquely identified by a primary key using an arbitrary integer. The attributes of an implementation are its name and a textual description. (Most of the meaning of an implementation is determined by its relationships with other entities.) The implementation entity 610 is used by the service implementation entity 670, technology set entity 660, system component entity 680, implementation use entity 230, and repository distribution entity 630; each of these associates an implementation with some number of other entities. Technology components are identifiable elsewhere in this model as services, technology items, and systems. Why then have yet another way to categorize technology called "implementations?" The answer is that each of the other ways of identifying technology are determined by views not under the control of the enterprise architect: services are defined by standards bodies, technology items are defined by vendors, and systems are defined by the organizations that paid for them to be built. How then would an architect refer to a small mixed collection of technology items from different vendors that provide a variety of different services in different systems? Such a combination might in fact represent a logical "technology unit" in the enterprise architecture (e.g., one vendor's Web browser used as an email client combined with another vendor's mail server to provide email services). The implementation entity 610 addresses this issue. It allows the enterprise architect to organize and specify the enterprise technology components in ways that make sense for the architecture, independently of how those same components are identified by other organizations or groups.

The technology items (software and hardware) entity 620 is depicted in FIG. 6. Enterprises use a wide variety of specific software and hardware products or packages. This technology is represented as three tightly coupled entities.

Technology items, which encompass both software and hardware products

Software, which includes only non-tangible information that contains instructions for computing devices (software entity 690)

Hardware, which includes only physically tangible information technology (hardware entity 700).

Each technology item identifies a single nameable product that is either software or hardware. (In a few cases, such as a router with factory-loaded software or firmware, a single technology item might be both software and hardware.) The item need not be a COTS product; consider an enterprise-developed software package, for example. A major focus of the enterprise architect is to identify how the technology items are logically distributed through implementations within systems. The software entity 690 contains software-unique attributes of technology items (e.g., source language), while the hardware entity 700 contains hardware-unique attributes (e.g., model number). Each instance of a technology item is uniquely identified by an a primary key using arbitrary integer. Instances of software and hardware are uniquely identified by the same key as their associated technology item. The attributes of a technology item are its name, an availability date, a textual description, and a textual comment. The attributes of: hardware are its vendor (text) and model number (text). The attributes of software are its acronym (text), source language (text), version (text), size (number), quantity of components (long), developer (text), source license availability (binary), user satisfaction (number), strategic value (number), technical quality (number), technical evolution (number). The technology item entity 620 is used by the technology item type entity 710, technology set entity 660, technology security entity 340, and technology acquisition entity 460; each of these associates a technology item with some number of other entities. Also, a technology item must have an associated software or hardware instance (or possibly both). These entities are essential components of the enterprise technology architecture. Normalizing technology items as three distinct entities eliminates many potential null-valued attributes.

A technology acquisition items entity 650 is depicted in FIG. 6. An enterprise often acquires a diverse group of technology items as a bundled single acquisition. Therefore, when baselining technology costs it may be difficult or impossible to determine item-by-item costs. The technology acquisition item entity 650 allows one to record the association of multiple technology items with a single technology acquisition. Each instance of this entity is uniquely identified by a primary key using a combination of two keys inherited from the technology item entity 620 and technology acquisition entity 460. The only attribute of this entity is a quantity [of items acquired] (integer). The technology distribution entity 650 uses the technology item entity 620 and technology acquisition entity 460; each technology acquisition item instance must be associated with exactly one of each of these entities. This entity is necessary to represent the relationship between technology items and acquisitions.

A technology sets entity 660 is depicted in FIG. 6. An enterprise architect may need to specify multiple, distinct products as part of a logically integrated implementation of some generic service. For example, a specific implementation of a standard e-mail service may include one vendor's server software and another vendor's client software. The technology set entity records this many-to-many relationship between implementations and technology items. Each instance of this entity is uniquely identified by a primary key using a combination of two keys inherited from the technology item entity 620 and implementation entity 610. The only attribute of this entity is an explanatory annotation (text). The technology set entity 660 uses the implementation entity 610 and technology item entity 620; each technology set instance must be associated with exactly one instance of each of the entities. This entity is necessary to represent the relationship between implementations and technology items.

The service implementations entity 670 is depicted in FIG. 6. A generic service defined by a service model can be implemented by a variety of different real products; conversely, a single product can be an implementation of a range of services. The service implementation entity records this many-to-many relationship between generic services and their implementations. Each instance of this entity is uniquely identified by a primary key using a combination of two keys inherited from a service entity 720 and implementation entity 610. The only attribute of a service implementation is an explanatory annotation (text). The service implementation entity 670 uses the service entity 720 and implementation entity 610; each service implementation instance must be associated with exactly one instance of each of these entities. This entity is necessary to represent the relationship between services and implementations.

The system components entity 680 is depicted in FIG. 6. From the perspective of an enterprise architecture, a system is simply a collection of service implementations. However, the same implementation may also be used in multiple systems. The systems component entity records this many-to-many relationship between systems and the implementations of generic services. Each instance of this entity is uniquely identified by a primary key using a combination of two keys inherited from a system entity 730 and implementation entity 610. The only attribute of this entity is an explanatory annotation (text). The system component entity 680 uses the system entity 730 and implementation entity 610; each system component instance must be associated with exactly one instance of each of these entities. This entity is necessary to represent the relationship between systems and implementations. It could have been called "system implementation", but this would have implied an entity that represents different (complete) implementations of systems. The name "system component" more closely suggests the desired interpretation (i.e., the various technology implementations that serve as components of each system).

The technology item types entity 710 is depicted in FIG. 6. Specific items of technology used by an enterprise may be categorized according to a wide variety of groupings. For example, a particular software product might function as a word processor, e-mail client, and HTML browser. The technology item type entity 710 records this many-to-many relationship between technology types and technology items. Each instance of this entity is uniquely identified by a primary key using a combination of two keys inherited from: the technology item entity 620 and a technology type entity 740. The only attribute of this entity is an explanatory annotation (text). The technology item type entity 710 uses the technology type entity 740 and technology item entity 710; each technology item type instance must be associated with exactly one instance of each of the entities. This entity is necessary to represent the relationship between technology types and items.

A services entity 720 is depicted in FIG. 6. A service is a segment of a service layer that provides a limited, well-defined set of automated functions. For example, data dictionary and window management services are distinct services within the application platform layer of the TAFIM service model. Services are the fundamental bricks from which a service model is constructed; they are often meticulously defined by interface specifications. These specifications are critical for the work of the systems engineer, but the enterprise architect is working at a higher level of abstraction, and usually only needs to identify how different services are implemented and used. Note that a single service can be associated with multiple service layers and multiple implementations. Each instance of this entity is uniquely identified by a primary key using an arbitrary integer. The attributes of a service are its name and a textual description. The service entity 720 is used by the service implementation entity 670 and service set entity 750; each of these associates a service with one or more other entities.

A systems entity 730 is depicted in FIG. 6. Baselining the specific information technology of an enterprise often begins by identifying systems: collections of hardware and software that provide interrelated automated services. Typically, systems are identified by the enterprise itself on the basis of what technology is used together to support some process. From the perspective of this enterprise architecture model, however, a system is defined to be a collection of implementations of some services; each implementation itself represents one or more technology items. Each instance of this entity is uniquely identified by a primary key using an arbitrary integer. The attributes of a system are its acronym, name, a textual description, and a textual comment. The system entity 730 is used by the system component entity 680, which associates a system with one or more implementations and vice versa. The systems entity 730 is an important part of the enterprise technology architecture. From the perspective of the essential logical design of an enterprise architecture, the system entity may appear to be more useful than it actually is. Automated systems have definitions or boundaries that are often determined by whomever pays to build or maintain the technology, rather than by any consistent logic of enterprise-wide technology use. (This is one reason for creating the implementation entity.) In spite of this problem, systems are probably the technology entities most recognizable to enterprise decision makers and IT managers, and most easily available baseline information is probably collected with respect to systems, so it makes sense to incorporate them in this database.

A technology types entity 740 is depicted in FIG. 6. Every enterprise employs a wide variety of technology in its information systems architecture. In order to make good strategic architecture decisions, the different types of technology must be identified, inventoried, and evaluated. The TAFIM identifies a variety of technology types (e.g., workstations, LANs, I/O peripherals, etc.), and additional types can be established as needed. To simplify this specification, technology types may overlap. For example, an enterprise architect may specify both "personal computer"; and "workstation"; as identifiable technology types; individual technology items may then be associated with multiple technology types. Each instance of this entity is uniquely identified by a primary key using an arbitrary integer. The attributes of a technology type are its name and a textual description. The technology type entity 740 is used by the technology item type entity 710; which associates technology items with technology types.

A service sets entity 750 is depicted in FIG. 6. In any abstract service model, it is possible to define services that cross more than one service layer, or to define overlapping service layers. The service set entity 750 allows the architect to specify the potential many-to-many relationship between services and service layers. Each instance of this entity is uniquely identified by a primary key using a combination of two keys inherited from the service entity 720 and a service layer entity 760. The only attribute of a service set is an explanatory annotation (text). The service layer entity 760 depends upon the service layer entity 760 and service entity 720. Each service set instance associates a single service with a single service layer.

The service layers entity 760 is depicted in FIG. 6. Most service models categorize different types of services into broad groupings or layers. (See the Service Models entity 770 for examples.) Each layer identifies some subset of automated system capabilities. Typically, these layers are established according some generic principles that are significant to the overall service model. For example, the five layers of the Common Object Request Broker Architecture (CORBA) service model reflect different degrees of service reusability: services in the application layer are enterprise- and mission-specific, whereas services in the object request broker layer are used by any function that requires interobject communication. Other service models use different criteria for defining service layers. Note that service layer definitions may overlap. For example, the TAFIM technical reference model specifies a layer of security services that cuts across other service layers. Each instance of this entity is uniquely identified by a primary key using an arbitrary integer. The attributes of a service layer are its name and a textual description. The service layer entity 760 depends upon the service model entity 770 and is used by the service set entity 750. Each service set instance associates a service with a service layer.

The service models entity 770 is depicted in FIG. 6. There are a variety of different ways of defining a service model: a generic model of automated system capabilities. The TAFIM defines one such service model based upon three distinct. groups or layers of services (application software, application platform, and external entities), but others are possible. For example, the Common Object Request Broker Architecture (CORBA) of the Object Management Group is based upon five distinct layers: applications, vertical facilities, horizontal facilities, services, and object request brokers. The ISO's Open Systems Interconnection model has seven layers, and so on. Any given technology item may provide a range of services that can be described differently within different service models, and the architect may desire to represent these relationships. Each instance of this entity is uniquely identified by a primary key using an arbitrary integer. The attributes of a service model are its name and a textual description containing any other unstructured information (e.g., the name of the organization that defines the service model). The service model entity 770 is used by the service layer entity 760. Each instance of a service layer must have (belong to) exactly one service model. The service models, service layers, service sets and services themselves are a rather abstract way of specifying the technology components of an enterprise architecture. They are included in the database because the enterprise architect is often required to specify a new architecture or existing architecture in terms of service models defined by external standards bodies. Since it is unlikely that all the technology components of an enterprise will be easily associated with a single standard service model, this database makes it feasible to associate different technology components with different service models.

It should be appreciated that more attributes could easily be added to any of the entities in this framework 900. For example, it is envisioned adding temporal (timestamp) attributes to a number of entities in the framework in order to model the evolution of an enterprise architecture.

Figure 8:
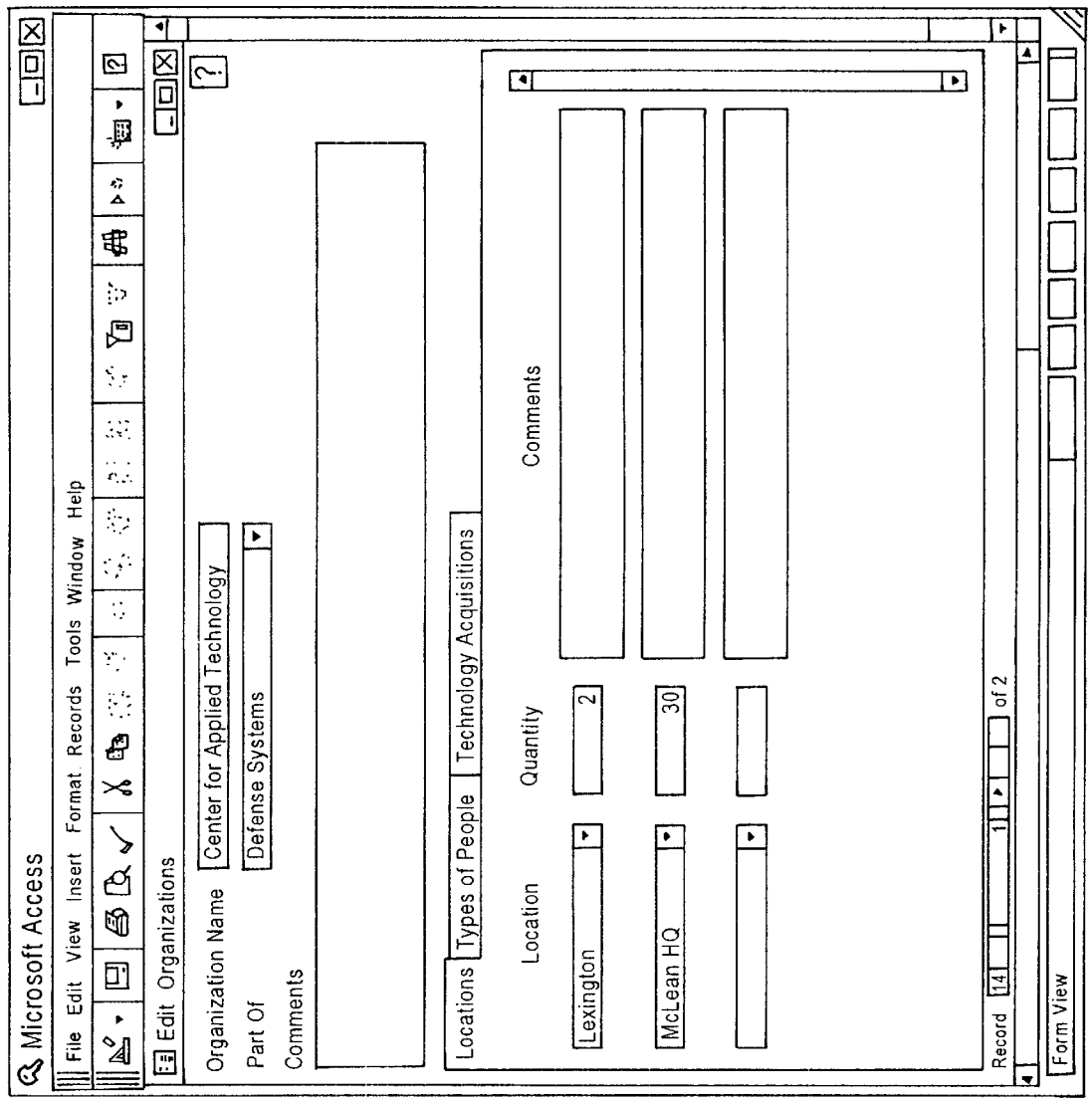
FIG. 8 is a screen showing how attributes are entered into a database program.

A screen depicting input of information into the database is illustrated in FIG. 8. The enterprise architect provides the possible attributes that may be entered into the database. The data architecture of the present invention enforces consistent description format among like entries and descriptions. For consistency, pull-down menus generated by extracting domains from other database entities are used to ensure that the consistent entries are made by different people. Without such a constraint, one person might enter a computer as an HP computer and another person might enter (or retrieve) the same technology items as a Hewlett-Packard computer. The use of pull down menus mitigates this problem.

QUERIES

Figure 9:
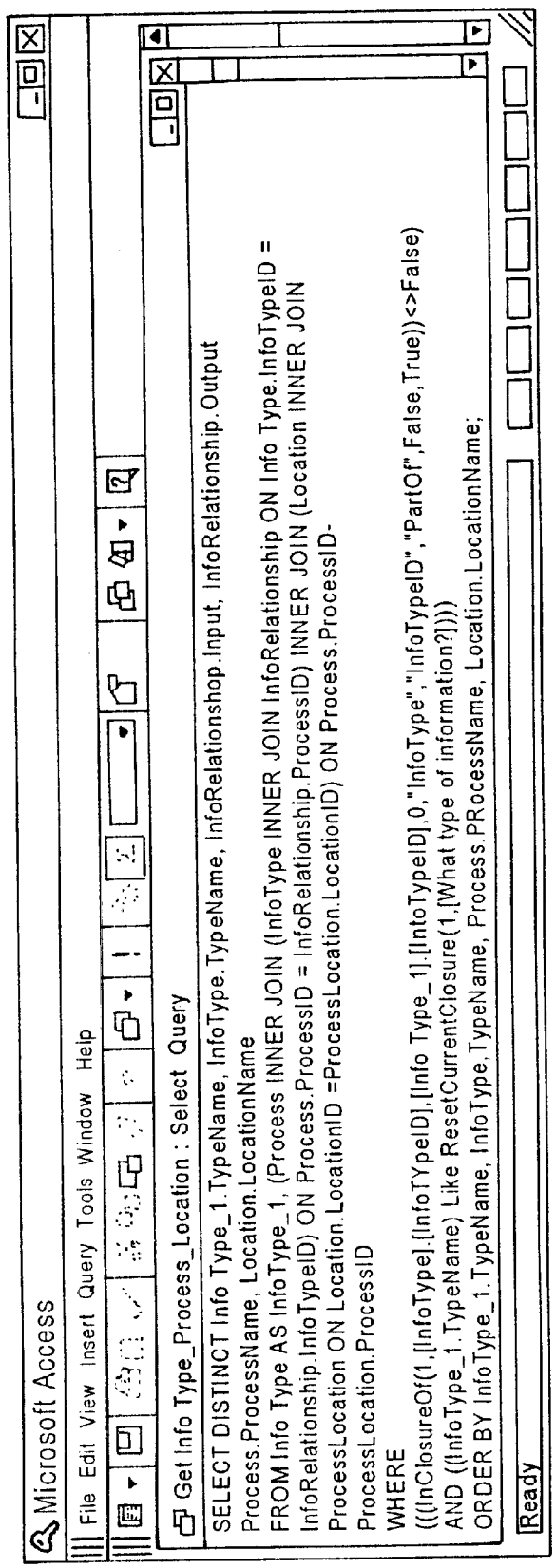
FIGS. 9 and 10 are illustrations of a screen showing the results of a query.
Figure 10:
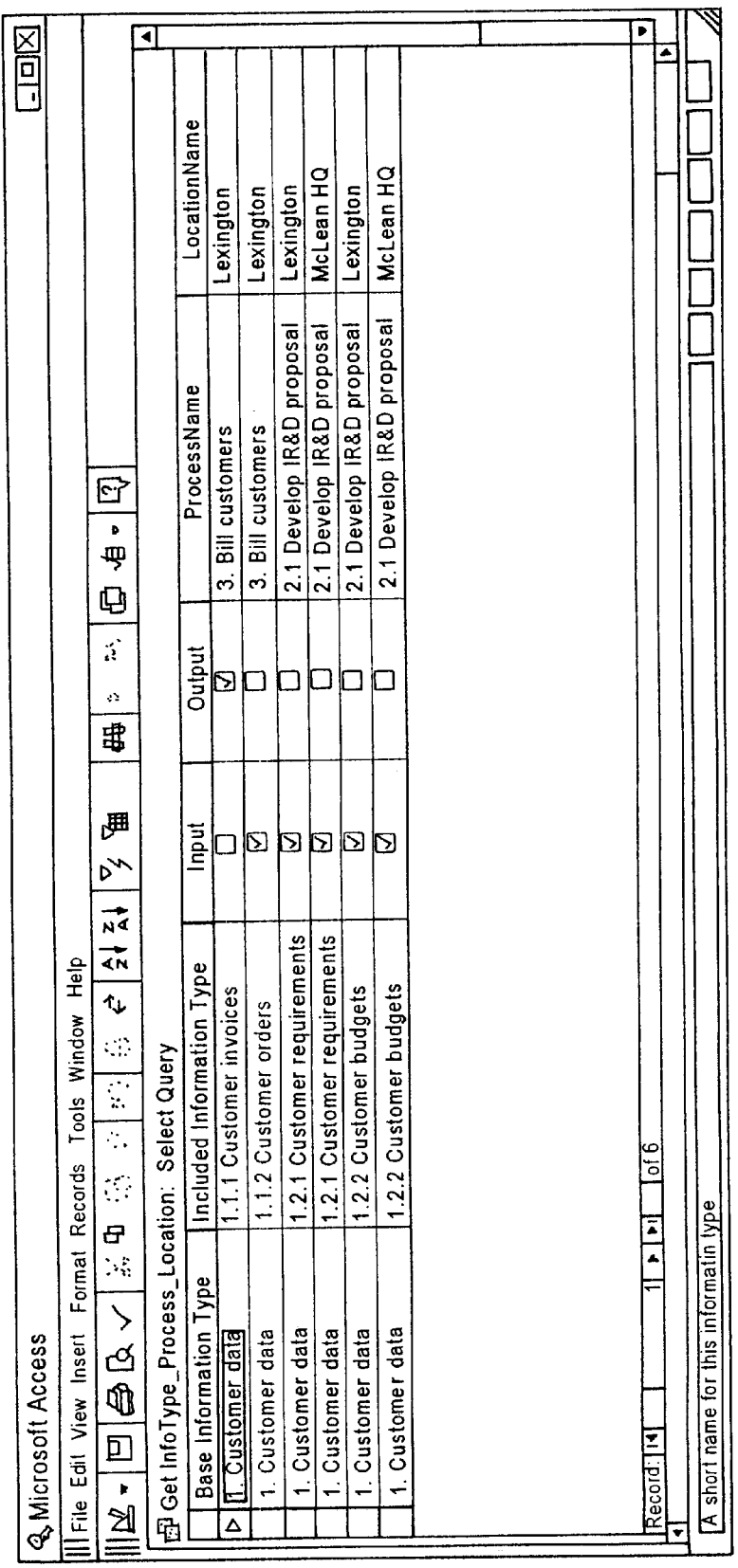

The information retrieval tools by the database program such as Microsoft Access are called queries. This application program, like most others, uses an industry standard query language, called SQL (Structured Query Language), which defines the syntax and interpretation of the queries which can by used by applications to store, retrieve and manipulate data in a database system. For the purposes of this description it is assumed that that queries. are in standard SQL. A sample query is shown and the links between tables in FIG. 9. The sample query asks for all processes relating to customer data. In this example, customer data is used to bill customers and develop IR & D proposals and is used at the Lexington and McLean locations as illustrated in FIG. 10.

Because some of the relations defined in the enterprise architecture database models are recursive in nature, best use of the framework would imply a need to be able to query on the partial or complete transitive closure of these relations. For example, one might wish to retrieve all information (sub)types that are included directly or indirectly in a given information type. Currently, SQL is inadequate for expressing recursive queries, although future versions of the evolving SQL standard (SQL3) are expected to be able to represent such queries directly. However, a skilled practitioner may solve this problem using standard SQL by implementing well-known methods for computing relation fixed points in separate software modules. For example, see the various methods for computing derived relations identified in Clement T. Yu and Weiyi Meng, "Principles of Database Query Processing for Advanced Applications", Morgan Kaufmann, San Francisco, Calif. 1998.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A memory for storing data for access by a database program being executed on a computer system for evaluating an enterprise architecture, comprising:
   a data structure stored in the memory, the data structure including information resident in a database used by the database program and including:
   a work flow architecture model including a plurality of entities and relationships;
   an information architecture model including a plurality of entities and relationships; and
   a technology architecture model including a plurality of entities and relationships;
   wherein selected entities link the work flow architecture model, the information architecture model and the technology architecture model;
   wherein the computer system executes the database program for accessing the memory store and evaluating linkages within and among the work flow architecture model, information architecture model, and technology architecture models;
   wherein, in order to make decisions about business restructuring, internal technology investment, or enterprise-level system architectures, a user analyzes dependencies between the structure and function of an enterprise and the information technology relied upon by the enterprise to determine the impact of information technology changes upon enterprise structure and function.

2. The memory for storing data of claim 1, further comprising a process relationship type entity linked to the process relationship entity and a process entity linked to the process relationship entity, the process relationship entity inheriting attributes from the process relationship type entity and the process entity.

3. The memory for storing data of claim 2, wherein the process entity includes a to process attribute and a from process attribute.

4. The memory for storing data of claim 1, wherein the data structure includes an information access type entity, an information format entity, process a relationship type entity, a security classifications entity, a service model entity, a service layer entity, a services entity, and a technology types entity.

5. The memory for storing data of claim 1, wherein the data structure includes an implementation entity, an information repositories entity, a locations entity, an organizations entity, a processes entity, a systems entity, and a technology items entity.

6. The memory for storing data of claim 1, wherein the data structure includes an implementation use entity which inherits attributes from a process role entity and an implementation entity.

7. The memory for storing data of claim 1, wherein the data structure includes an information access entity which inherits attributes from a process role entity, an information access type entity and a repository entity.

8. The memory for storing data of claim 1, wherein the data structure includes an information distribution entity which inherits attributes from an information type entity and an information repository entity.

9. The memory for storing data of claim 1, wherein the data structure includes an information relationships entity which inherits attributes from an information type entity and a process entity.

10. The memory for storing data of claim 1, wherein the data structure includes an information repository format entity which inherits attributes from an information format entity and an information repository entity.

11. The memory for storing data of claim 1, wherein the data structure includes a location people entity which inherits attributes from a location entity and a type of person entity.

12. The memory for storing data of claim 1, wherein the data structure includes an organization locations entity which inherits attributes from a location entity and an organization entity.

13. The memory for storing data of claim 1, wherein the data structure includes an organization people entity which inherits attributes from an organization entity and a type of person entity.

14. The memory for storing data of claim 1, wherein the data structure includes an organization roles entity which inherits attributes from an organization role type entity, an organization entity and a process entity.

15. The memory for storing data of claim 1, wherein the data structure includes an organization role people entity which inherits attributes from an organization role people entity and a type of people entity.

16. The memory for storing data of claim 1, wherein the data structure includes a process locations entity which inherits attributes from a location entity, a process entity and a security classifications entity.

17. The memory for storing data of claim 1, wherein the data structure includes a process roles entity which includes attributes inherited by an access entity and an implementation use entity and which inherits attributes from a process entity and a type of people entity.

18. The memory for storing data of claim 1, wherein the data structure includes a repository distribution entity which inherits attributes from an information repository entity, an implementation entity and a location entity.

19. The memory for storing data of claim 1, wherein the data structure includes a service implementation entity which inherits attributes from a service entity and an implementation entity.

20. The memory for storing data of claim 1, wherein the data structure includes a system components entity which inherits attributes from a system entity and an implementation entity.

21. The memory for storing data of claim 1, wherein the data structure includes a technology acquisitions entity which inherits attributes from an organization entity and which has attributes inherited by a technology acquisition item entity.

22. The memory for storing data of claim 1, wherein the data structure includes a technology acquisition items entity which inherits attributes from a technology item entity and a technology acquisition entity.

23. The memory for storing data of claim 1, wherein the data structure includes a technology distribution entity which inherits attributes from a technology item entity and a location entity.

24. The memory for storing data of claim 1, wherein the data structure includes a technology item types entity which inherits attributes from a technology type entity and a technology item entity.

25. The memory for storing data of claim 1, wherein the data structure includes a technology security entity which inherits attributes from a location entity, a technology item entity and a security classification entity.

26. The memory for storing data of claim 1, wherein the data structure includes a technology sets entity which inherits attributes from an implementation entity and a technology item entity.

27. A computer-readable medium having a data structure representing an enterprise architecture stored thereon for access by a data processing system to evaluate the enterprise architecture, the data structure comprising:
- a work flow architecture model including a plurality of entities;
- a technology architecture model including a plurality of entities; and
- an information architecture model including a plurality of entities;
- wherein the work flow architecture model, information architecture model and technology architecture model form an enterprise architecture;
- wherein the computer system executes the database program for accessing the memory store and evaluating linkages within and among the work flow architecture model, information architecture model, and technology architecture models;
- wherein, in order to make decisions about business restructuring, internal technology investment, or enterprise-level system architectures, a user analyzes dependencies between the structure and function of an enterprise and the information technology relied upon by the enterprise to determine the impact of information technology changes upon enterprise structure and function.

28. The computer-readable medium of claim 27, wherein selected entities link the work flow architecture model, the information architecture model and the technology architecture model.

29. A computer implemented method for storing data for access by a database program being executed on the computer for evaluating an enterprise architecture, comprising:
- defining entities within at least one of a work flow architecture model, an information architecture model and a technology architecture model;
- classifying and inputting data into a work flow architecture model, an information architecture model and a technology architecture model, each of the models having entities with each of the entities having at least one attribute;
- linking each of the entities of the work flow architecture model, the information architecture model and the technology architecture model and defining relationships between the linked entities;
- storing the linked entities and input data on a storage device associated with a computer having a database program, the database program capable of allowing users to input and search for how architectural changes to the enterprise affects the enterprise architecture; and
- generating a screen on which a user inputs a search to show the relationships between linked entities in the enterprise architecture and displays results retrieved by the search;
- wherein the computer system executes the database program for accessing the memory store and evaluating linkages within and among the work flow architecture model, information architecture model, and technology architecture models;
- wherein, in order to make decisions about business restructuring, internal technology investment, or enterprise-level system architectures, a user analyzes dependencies between the structure and function of an enterprise and the information technology relied upon by the enterprise to determine the impact of information technology changes upon enterprise structure and function.

30. An enterprise architecture system, comprising:
a data structure comprising:
- a work flow architecture model including a plurality of entities;
- an information architecture model including a plurality of entities;
- a technology architecture model including a plurality of entities and a technology item; and
- a database program for managing the data structure to allow users to input and search for how architectural changes to the enterprise affects the enterprise architecture.

* * * * *